Dec. 15, 1970  H. S. CHIU ET AL  3,547,662
METHOD OF PRODUCING A FOOD CASING
Filed June 23, 1967
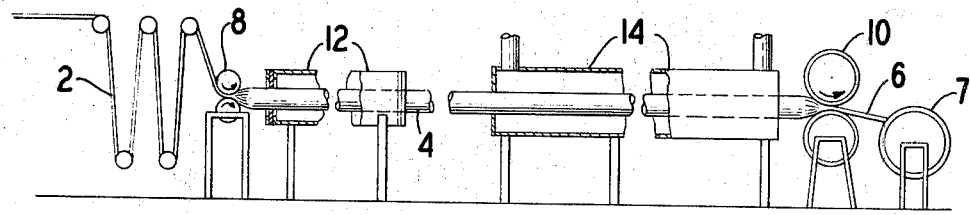
FIG.I.
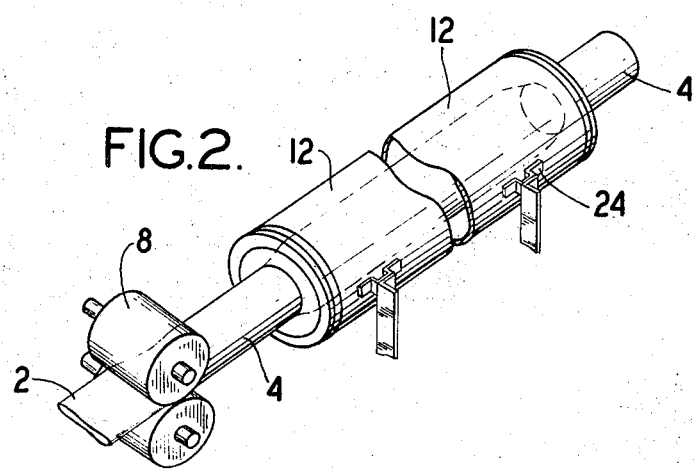
FIG.2.
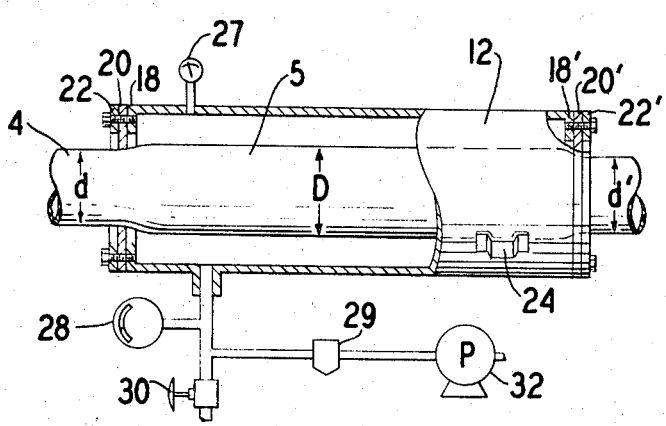
FIG.3.
INVENTORS
HERMAN S. CHIU
FRANK T. KAMBARA
JEROME J. M. RASMUSSEN
DAVID VOO
BY
ATTORNEY

United States Patent Office 3,547,662
Patented Dec. 15, 1970

3,547,662
METHOD OF PRODUCING A FOOD CASING
Herman S. Chiu and Frank T. Kambara, Chicago, Jerome J. M. Rasmussen, South Stickney Township, and David Voo, Park Forest, Ill., assignors to Union Carbide Corporation, a corporation of New York
Filed June 23, 1967, Ser. No. 648,409
Int. Cl. A22c 13/00
U.S. Cl. 99—176
4 Claims

ABSTRACT OF THE DISCLOSURE

The stuffing characteristics of tubular fibrous food casings made from paper impregnated and coated with cellulose regenerated and dried in situ are improved by circumferentially stretching the casing during manufacture before the regenerated cellulose is dried. Stretching is preferably accomplished by passing the inflated tube through a vacuum. The tube is reduced in diameter to below its recommended stuffing diameter after it has been stretched.

---

This invention relates to food casings and their production and has particular reference to fibrous casings having uniform circumferential expansion characteristics during stuffing with food products so that the finished food product is dimensionally uniform.

Fibrous casings are widely used for processing and packaging food products and more especially meat products such as bologna, salami and the like. These casings are composed of a paper tube which is impregnated and coated with cellulose regenerated in situ from a viscose solution applied to the tube. Methods and apparatus for making such casings are well known to the art and are described for example in Smith Pats. 2,105,273; 2,144,899; and 2,144,900. The casings are supplied to the trade in flat, dry condition in standard lengths and diameters.

When the user of fibrous casing is ready to stuff it, in conventional practice one end of the casing is closed by a clip or other device, and the casing is soaked in water for about 30 minutes. The wet, pliable casing is slipped over the stuffing horn of a stuffing machine. The wet casing is then filled with the meat emulsion which is extruded under pressure through the orifice of the stuffing horn and into the interior of the casing. The operator, during filling of the casing, circumferentially grips the wall of the casing about the stuffing horn whereby the meat emulsion is subjected to pressure within the casing, and the latter is expanded and advanced off the horn by the pressure exerted thereon by the meat emulsion. When the casing is filled and sufficiently expanded, the open end portion is gathered and tied to form a compact, taut, stuffed casing. The meat product encased in the fibrous casing is thereafter cooked in hot water or hot air or hung in a smokehouse and smoked. The products are then cooled by showering with water and then stored under refrigeration.

Precise size control of the fibrous casing conventionally supplied to the sausage trade is difficult because at the final pressures used in stuffing there is a change in the circumference of the casing with small changes in stuffing pressure. Precise size control is required because a large volume of sausage products are marketed today in the form of packaged slices, and the packaging methods are dependent upon uniform weight and circumference of each slice.

In addition, fibrous casings produced from paper cut from different locations across a master paper roll frequently exhibit non-uniform stretch characteristics due to differences in the shrink characteristics across the width of the master paper roll. The casings produced from paper cut obtained near the center of a master paper roll generally stretch less and yield a somewhat smaller diameter than casings produced from paper cut near the edges of the master paper roll when similarly stuffed out.

The magnitude of the difference in the casings' circumferences may not seem large to the layman, but to those skilled in the sausage trade, this piece-to-piece product circumference variation is considered undesirable. Upon slicing such products, the resultant slices varied in weight and in circumference and thus were not wholly satisfactory for uniform weight-piece count packages packaged by methods dependent upon weight and circumference of each slice.

An object of this invention is to provide a method for producing an improved fibrous casing having more uniform piece-to-piece expansion characteristics upon being rewet, stuffed, and processed.

Another object of this invention is the production of fibrous casings with uniform stretch characteristics when produced from various master base paper roll cut positions.

Another object of this invention is to provide a method for producing an improved fibrous casing having more uniform top-to-bottom expansion characteristics upon being rewet, stuffed, and processed.

Another object of this invention is to provide a casing that stuffs to the desired product circumference with less effort on the part of the operator and prevents operator fatigue.

In accordance with the invention these objects are achieved by the introduction of a new step in the manufacture of fibrous casings. Thus, after the applicaibn of a viscose solution to a paper tube and the regenertion of cellulose in situ to produce a paper tube impregnated and coated with a wet gel of regenerated cellulose the tube is circumferentially prestretched to a diameter greater than the predetermined desired diameter of finished casing. The stretched casing material is then reduced to the predetermined desired diameter preferably without deflating and re-inflating it. Preferably prestretching and at least some reduction are completed before drying is initiated and prestretching is accomplished by passing the inflated, wet, gel-coated tube through a partial vacuum. Casing produced by the improved method of the invention is more uniform in stuffing characteristics and can be stuffed at lower pressures than casing produced in the conventional manner.

In the accompanying drawing:

FIG. 1 is a schematic elevation, partially in section, of a production line having apparatus suitable for use in the practice of the invention;

FIG. 2 is an isometric view of a part of the apparatus shown in FIG. 1; and

FIG. 3 is a front elevation partially in section of the apparatus of FIG. 2.

As shown in FIG. 1 apparatus for practicing the invention comprises a pair of driven rolls 8 for advancing wet, flattened casing material 2, a vacuum chamber 12, a drying chamber 14, a pair of squeeze rolls 10 for flattening dried casing material and a reel 7 for winding the finished casing material. For a complete understanding of the practice of the invention it will be described with reference to the operation of the apparatus as well as to its manipulative steps.

Referring now to the drawing, flattened, tubular, seamed, fibrous sausage casing 2 (FIG. 1) after being formed, washed, and glycerinated in conventional manner is passed into the nip of the driven squeeze rollers 8 at least one of which is preferably rubber coated. The casing is inflated by a bubble of air produced in conventional manner, said air bubble being maintained in a relatively fixed position between the nips of the squeeze rollers 8 and the dry end squeeze roller 10. The wet inflated casing 4 is passed into a vacuum chamber shown generally as 12, where the casing is circumferentially stretched from diameter $d$ (FIG. 3) to a predetermined greater diameter D. After leaving the vacuum chamber 12, the casing enters into the drying chamber 14 wherein it is dried to the desired moisture content. After the casing leaves the drying chamber 14, it passes between squeeze rollers 10 and is flattened and wound upon reel 7. It should be pointed out that as illustrated, the casing material is not collapsed between stretching and drying although if desired, it may be.

The vacuum maintained inside the vacuum chamber 12 is used to circumferentially expand and stretch the wet inflated casing 4. The vacuum chamber 12 is mounted and supported by support clips 24 (FIGS. 2 and 3) at the location intermediate to the wet end squeeze rollers 8 and the drying chamber 14. The vacuum level inside the chamber is indicated by a vacuum gauge 27 (FIG. 3) and is sensed and controlled by a vacuum controller 28. When the vacuum level in the vacuum chamber 12 drops to below a preset value on the controller 28, it activates and closes a relief valve 30, and the continuous pumping action of a vacuum pump 32 removes sufficient air from the vacuum chamber 12 until the vacuum inside is above the preset value on the controller 28. The controller 28 again activates the relief valve 30 and opens it until sufficient air is bled into the vacuum chamber 12 to a vacuum level below the preset value on the controller 28. This process is repeated and the fluctuation of vacuum level inside the chamber around the preset value may be held to approximately ±0.1 inch Hg. Of course, any conventional way of providing, maintaining, and controlling the vacuum in the chamber 12 may be used.

As the wet inflated casing 4 enters the vacuum chamber 12, the vacuum inside the chamber has a tendency to pull the casing into the chamber. The casing is advanced to and through inlet seal 20 (FIG. 3) and outlet seal 20' which is fitted between respective end walls 18, 18' and seal rings 22, 22'. The inlet and outlet seals 20, 20' can be fabricated from any low friction coefficient and high abrasive resistant materials such as polished stainless steel, polished glass, Teflon and such like materials. As soon as the wet inflated casing 4 enters the vacuum chamber 12, the casing is rapidly expended circumferentially. The amount of circumferential stretch depends upon the original diameter $d$ of the wet inflated casing 4 and the vacuum level maintained inside the vacuum chamber 12. Inside the vacuum chamber 12, the stretch inflated casing shown at 5 in FIG. 3 continues to expand slightly. For example, a size 6½ casing inflated to about 100 mm. of mercury internal pressure will expand circumferentially about 9% when passed through a vacuum of about 8 inches of mercury, most of the expansion occurring upon entrance to the chamber. The stretch inflated casing 5 is forced to pass through the seal at outlet 20' which may have the same size opening as the seal at inlet 20. The seal at outlet 20' is preferably provided with a rounded or tapered entry (not shown) to avoid crimping of the casing and to permit gentle necking down. A trap 29 is provided near the outlet seal 20' to remove moisture from the vacuum chamber. In chamber 12, expanded casing diameter is D. When advanced from the chamber, the diameter of the casing is reduced to diameter $d'$ which is less than diameter D but greater than diameter $d$. In the drying chamber 14, the diameter of the casing is further reduced to the predetermined, desired diameter.

A number of experiments on casings of different sizes have been made to demonstrate the efficacy of the invention. In these experiments casings of standard sizes identified numerically by reference to the width of the paper web from which the tube is made were used. In these experiments casing sizes 4 (paper width=10.187"), 6 (paper width=12.5625"), 6½ (paper width=13.125") 7 (paper width=13.5625"), and 8 (paper width=14.8125") were produced in accordance with the principles of the invention and were compared with similar casings produced in conventional manner in tests to be described. For each size of casing there is a desired stuffing diameter, and during stuffing of the casing with a food product such as a meat emulsion it is desired to obtain that diameter at the lowest possible stuffing pressure to lessen operator fatigue and to attain greater uniformity of product. Thus in one series of tests casings produced by the practice of the invention were rewet and inflated under different air pressures. The diameters of the inflated casings were measured.

EXAMPLE I

A number of samples of casing size 7 which has a desired stuffing diameter of 4.38 inches were produced. One set was made in conventional manner without prestretch. Others were prestretched under vacuum of 8 inches and 10 inches of mercury. The casings were inflated at different air pressures and diameters of inflated casings were measured. The results, shown in Table I, indicate that the prestretched casing of the invention attains the desired stuffing diameter at a lower pressure than the conventional casing.

TABLE I.—STRETCH CHARACTERISTICS OF CONTROL AND VARIOUS VACUUM STRETCHED SIZE 7 FIBROUS CASINGS.[1]

| Sample * Set No. | Vacuum chamber length (in.) | Casing production condition vacuum (in. of Hg.) | Casing diameters in inches expanded to the following air pressures—mm. Hg | | | | | | Dwell time in vacuum chamber (secs.) |
|---|---|---|---|---|---|---|---|---|---|
| | | | 50 | 100 | 150 | 200 | 300 | 400 | |
| 1 | | (²) | 4.02 | 4.26 | 4.37 | 4.43 | 4.51 | 4.59 | 0 |
| 2 | 6 | 8 | 4.14 | 4.32 | 4.41 | 4.45 | 4.52 | 4.59 | 1.5 |
| 3 | 6 | 10 | 4.16 | 4.34 | 4.44 | 4.49 | 4.55 | 4.61 | 1.5 |
| 4 | 12 | 10 | 4.17 | 4.36 | 4.45 | 4.51 | 4.56 | 4.62 | 3.0 |

\* Average of 5 pieces.
[1] Recommended stuffing diameter = 4.38 inches.
[2] Control—no vacuum.

EXAMPLE II

To determine the effects of lower vacuum treatment than utilized in the previous example, several samples of casing size 6½ were tested. The desired stuffing diameter for this size is 4.24 inches. Samples prestretched in vacua of 2", 4", 6" and 8" of mercury were prepared and inflated at different air pressures and the results compared with tests made on similar casing made by conventional practice, that is without prestretching. As may be seen in Table II below, less pressure was required to attain the desired 4.24 inches diameter in prestretched casing than in the conventional casing. Also, the higher the vacuum employed in prestretching, the lower the pressure required to attain the 4.24 inches diameter. In most instances casing produced in accordance with the invention attained this diameter at pressures of 200 mm. of mercury or below while pressures close to 250 mm. were required to inflate the conventional casing to the desired diameter.

It is also observed from the data in Table II that the circumferential dimension of conventional casing is more sensitive to changes in stuffing pressure than the prestretched casing of the invention in the range of 150 to 250 mm. of mercury (mm. Hg). This is particularly noticeable when comparing the regular-control casing with the 8″ Hg vacuum stretched fibrous casing. For example, at 150 mm. Hg, the regular-control casing expands to give a diameter of 4.13 inch. This diameter increases by 0.14 inch to 4.27 inch at 250 mm. Hg. The 8″ Hg vacuum stretch casing has a diameter of 4.22″ at 150 mm. Hg. internal pressure. This diameter increases by only 0.08 inch (compared to 0.14 inch with the control) to give a casing expanded diameter value of 4.30″ at 250 mm. Hg. In other words, any variation in the stuffing operator's pressure applied to expand the casing will result in less circumferential changes in the 8″ Hg vacuum stretched casing than the regular-control casing. The data indicate that casings produced in accordance with the principles of the invention will exhibit greater piece-to-piece dimensional uniformity than casing produced in conventional manner since the former is less sensitive to variation in stuffing pressure than the latter.

EXAMPLE III

Tests such as those described with reference to the preceding examples were also made on casing sizes 7½ and 8. These casings have desired stuffing diameters of 4.59″ and 4.80″ respectively. Data obtained are also set forth in Table II and again it should be noted that the casing of the invention consistently attains the desired diameter at lower pressures than the corresponding conventional casing. It may also be noted that in general the larger casings attain the desired diameter at lower pressures than the smaller sizes.

The data in Table II also indicate that less operator energy would be required to stuff the prestretched casing to the desired product diameter than to stuff the normal casing to the same desired product diameter. Since the casing produced in accordance with the principles of the invention has already been prestretched, less operator energy is required to re-stretch the casing during stuffing.

TABLE II.—STRETCH CHARACTERISTICS OF VARIOUS VACUUM STRETECHED SIZE 6½ FIBROUS CASINGS

| Size and treatment | Casing diameter in inches expanded to air pressures— mm. Hg | | | | Recommended stuffing diameter |
|---|---|---|---|---|---|
| | 100 | 150 | 200 | 250 | |
| 6½ | 4.0s | 4.13 | 4.22 | 4.27 | 4.24 |
| Fibrous | 4.01 | 4.13 | 4.21 | 4.26 | 4.24 |
| Regular-control | 4.03 | 4.13 | 4.22 | 4.25 | 4.24 |
| No Vacuum | 4.03 | 4.14 | 4.22 | 4.28 | 4.24 |
| | 4.03 | 4.13 | 4.22 | 4.28 | 4.24 |
| Average | 4.03 | 4.13 | 4.22 | 4.27 | |
| 6½ | 4.01 | 4.15 | 4.20 | 4.27 | 4.24 |
| Fibrous | 4.06 | 4.17 | 4.24 | 4.28 | 4.24 |
| 2″ Hg Vacuum | 4.05 | 4.17 | 4.22 | 4.28 | 4.24 |
| | 4.06 | 4.17 | 4.22 | 4.28 | 4.24 |
| | 4.01 | 4.13 | 4.19 | 4.24 | 4.24 |
| Average | 4.04 | 4.16 | 4.21 | 4.27 | |
| 6½ | 4.05 | 4.19 | 4.23 | 4.27 | 4.24 |
| Fibrous | 4.09 | 4.18 | 4.23 | 4.27 | 4.24 |
| 4″ Hg Vacuum | 4.11 | 4.20 | 4.25 | 4.20 | 4.24 |
| | 4.09 | 4.19 | 4.21 | 4.25 | 4.24 |
| | 4.09 | 4.18 | 4.22 | 4.28 | 4.24 |
| Average | 4.09 | 4.19 | 4.23 | 4.28 | |
| 6½ | 4.09 | 4.19 | 4.23 | 4.28 | 4.24 |
| Fibrous | 4.10 | 4.19 | 4.23 | 4.27 | 4.24 |
| 6″ Hg Vacuum | 4.11 | 4.20 | 4.24 | 4.29 | 4.24 |
| | 4.09 | 4.18 | 4.21 | 4.25 | 4.24 |
| | 4.10 | 4.19 | 4.24 | 4.28 | 4.24 |
| Average | 4.10 | 4.19 | 4.23 | 4.27 | |
| 6½ | 4.12 | 4.21 | 4.27 | 4.29 | 4.24 |
| Fibrous | 4.14 | 4.23 | 4.29 | 4.31 | 4.24 |
| 8″ Hg Vacuum | 4.13 | 4.22 | 4.28 | 4.31 | 4.24 |
| | 4.13 | 4.22 | 4.28 | 4.31 | 4.24 |
| | 4.12 | 4.21 | 4.28 | 4.30 | 4.24 |
| Average | 4.13 | 4.22 | 4.28 | 4.30 | |
| 7½ | 4.30 | 4.51 | 4.59 | 4.64 | 4.59 |
| | 4.31 | 4.49 | 4.59 | 4.66 | 4.59 |
| 0″ Hg | 4.37 | 4.51 | 4.61 | 4.68 | 4.59 |
| | 4.36 | 4.50 | 4.60 | 4.68 | 4.59 |
| | 4.34 | 4.50 | 4.60 | 4.67 | 4.59 |
| Average | 4.34 | 4.50 | 4.60 | 4.67 | |
| 7½ | 4.32 | 4.51 | 4.60 | 4.67 | 4.59 |
| | 4.38 | 4.51 | 4.60 | 4.68 | 4.59 |
| 2″ Hg | 4.39 | 4.54 | 4.63 | 4.69 | 4.59 |
| | 4.37 | 4.51 | 4.60 | 4.67 | 4.59 |
| | 4.36 | 4.50 | 4.60 | 4.67 | 4.59 |
| Average | 4.36 | 4.51 | 4.61 | 4.68 | |
| 7½ | 4.39 | 4.54 | 4.61 | 4.68 | 4.59 |
| | 4.40 | 4.56 | 4.65 | 4.69 | 4.59 |
| 4″ Hg | 4.45 | 4.57 | 4.64 | 4.69 | 4.59 |
| | 4.45 | 4.58 | 4.65 | 4.69 | 4.59 |
| | 4.45 | 4.58 | 4.65 | 4.70 | 4.59 |
| Average | 4.43 | 4.57 | 4.65 | 4.69 | |
| 7½ | 4.41 | 4.57 | 4.65 | 4.69 | 4.59 |
| | 4.47 | 4.60 | 4.67 | 4.70 | 4.59 |
| 6″ Hg | 4.48 | 4.59 | 4.66 | 4.70 | 4.59 |
| | 4.47 | 4.59 | 4.67 | 4.70 | 4.59 |
| | 4.48 | 4.59 | 4.67 | 4.70 | 4.59 |
| Average | 4.46 | 4.59 | 4.66 | 4.70 | |
| 7½ | 4.49 | 4.61 | 4.69 | 4.74 | 4.59 |
| | 4.50 | 4.61 | 4.69 | 4.73 | 4.59 |
| 8″ Hg | 4.50 | 4.63 | 4.69 | 4.74 | 4.59 |
| | 4.50 | 4.62 | 4.69 | 4.73 | 4.59 |
| | 4.51 | 4.67 | 4.71 | 4.77 | 4.59 |
| Average | 4.50 | 4.63 | 4.69 | 4.74 | |
| 8 | 4.60 | 4.78 | 4.88 | 4.95 | 4.80 |
| Control | 4.65 | 4.80 | 4.89 | 4.97 | 4.80 |
| 0″ Hg | 4.68 | 4.82 | 4.90 | 4.98 | 4.80 |
| | 4.67 | 4.82 | 4.90 | 4.97 | 4.80 |
| | 4.63 | 4.79 | 4.89 | 4.94 | 4.80 |
| Average | 4.65 | 4.80 | 4.89 | 4.96 | |
| 8 | 4.60 | 4.77 | 4.88 | 4.95 | 4.80 |
| | 4.65 | 4.79 | 4.89 | 4.94 | 4.80 |
| 2″ Hg | 4.65 | 4.79 | 4.88 | 4.93 | 4.80 |
| | 4.67 | 4.80 | 4.89 | 4.94 | 4.80 |
| | 4.69 | 4.82 | 4.90 | 4.97 | 4.80 |
| Average | 4.65 | 4.79 | 4.89 | 4.95 | |
| 8 | 4.70 | 4.82 | 4.90 | 4.98 | 4.80 |
| | 4.67 | 4.80 | 4.90 | 4.98 | 4.80 |
| 4″ Hg | 4.69 | 4.82 | 4.90 | 4.96 | 4.80 |
| | 4.70 | 4.85 | 4.91 | 4.98 | 4.80 |
| | 4.69 | 4.81 | 4.90 | 4.97 | 4.80 |
| Average | 4.69 | 4.82 | 4.90 | 4.97 | |
| 8 | 4.69 | 4.83 | 4.90 | 4.95 | 4.80 |
| | 4.69 | 4.84 | 4.90 | 4.95 | 4.80 |
| 6″ Hg | 4.72 | 4.88 | 4.93 | 4.99 | 4.80 |
| | 4.73 | 4.88 | 4.94 | 4.99 | 4.80 |
| | 4.69 | 4.83 | 4.90 | 4.95 | 4.80 |
| Average | 4.70 | 4.85 | 4.91 | 4.97 | |
| 8 | 4.70 | 4.87 | 4.94 | 4.99 | 4.80 |
| | 4.71 | 4.89 | 4.95 | 4.99 | 4.80 |
| 8″ Hg | 4.71 | 4.89 | 4.95 | 4.99 | 4.80 |
| | 4.72 | 4.89 | 4.96 | 5.00 | 4.80 |
| | 4.72 | 4.88 | 4.95 | 4.99 | 4.80 |
| Average | 4.71 | 4.88 | 4.95 | 4.99 | |

EXAMPLE IV

Five samples each of the regular-control and the 8″ Hg vacuum stretched fibrous casings (size 6½) referred to in Table II were cut to forty inches long and were stuffed and processed with bologna emulsion. To determine the piece-to-piece uniformity of these products in a systematic manner, a piece-to-piece uniformity index was established as follows:

The circumference along the entire length of each product was measured at the following locations —2, 3, 4, 5, 6, 8, 10, and 15 inches from each end of the product—employing a tape which measures to an accuracy of 0.5 millimeter. In addition, the circumference at the middle of the product and the length of the product were measured. For vertically suspended products, the measurements from each end are distinguished as either the top or the bottom end. The ratios between the individually measured circumferences and the midde circumference was first calculated.

For each set of five products, the standard deviation of the five measurements at each circumferential location was determined. For example, the standard deviation at two inches from the top end is:

$$(S_2)_{Top} = \sqrt{\frac{\Sigma(C - C_{mean})_{2*}^2}{n-1}}$$

where:
S = standard deviation
C = circumference
$C_{mean}$ = means circumference
n = number of samples
2* = circumference measured at location 2

The piece-to-piece uniformity index, $U_p$, is defined and calculated by the following equation:

$$U_p = (S_2 + S_3 + S_4 + S_5 + S_6)_{Top}$$
$$+ (S_2 + S_3 + S_4 + S_5 + S_6)_{Bottom}$$
$$+ 2[(S_8 + S_{10})_{Top} + (S_8 + S_{10})_{Bottom}]$$
$$+ 5[(S_{15})_{Top} + (S_{15})_{Bottom}]$$
$$+ (L_{mean} - 30)S_M$$

where:
$L_{mean}$ = Mean product length in inches
$S_M$ = Standard deviation of middle circumference The bologna product circumferences stuffed in the regular and vacuum stretched casings are presented in Tables III and IV, respectively. The standard deviation values calculated from the data in Tables III and IV are presented in Table V. Also presented at the bottom of Table V is the calculated piece-to-piece uniformity index values. The higher this value, the lower the uniformity. The data clearly indicates that the piece-to-piece uniformity of the bologna stuffed in the vacuum stretch fibrous casing is superior to that of the regular fibrous casing as was predicted by the data presented previously in Table II.

TABLE III.—BOLOGNA PRODUCT CIRCUMFERENCES STUFFED IN REGULAR-CONTROL SIZE 6½ FIBROUS CASINGS

| Bologna product measurement locations | Finished product circumferences (centimeters) | | | | |
|---|---|---|---|---|---|
| | Sample One | Sample Two | Sample Three | Sample Four | Sample Five |
| Distance from top (in.): | | | | | |
| 2 | 31.65 | 31.80 | 32.15 | 31.50 | 31.90 |
| 3 | 32.25 | 32.40 | 32.10 | 32.40 | 32.60 |
| 4 | 32.65 | 32.60 | 32.80 | 32.60 | 32.70 |
| 5 | 32.75 | 32.70 | 32.90 | 32.70 | 32.80 |
| 6 | 32.80 | 32.80 | 32.90 | 32.70 | 32.85 |
| 8 | 32.90 | 32.90 | 33.00 | 32.80 | 32.90 |
| 10 | 33.00 | 33.05 | 33.15 | 33.00 | 33.00 |
| 15 | 33.20 | 33.25 | 33.20 | 33.15 | 33.20 |
| Middle | 33.20 | 33.25 | 33.35 | 33.15 | 33.20 |
| Distance from bottom (in.): | | | | | |
| 15 | 33.20 | 33.30 | 33.30 | 33.20 | 33.30 |
| 10 | 33.30 | 33.40 | 33.35 | 33.25 | 33.30 |
| 8 | 33.30 | 33.50 | 33.40 | 33.30 | 33.30 |
| 6 | 33.30 | 33.30 | 33.40 | 33.40 | 33.35 |
| 5 | 33.30 | 33.30 | 33.40 | 33.35 | 33.35 |
| 4 | 33.30 | 33.25 | 33.40 | 33.40 | 33.35 |
| 3 | 33.30 | 33.25 | 33.10 | 33.40 | 33.20 |
| 2 | 32.50 | 32.50 | 32.50 | 32.70 | 32.80 |
| Product length (inch) | 32.25 | 33.30 | 33.50 | 33.00 | 33.50 |
| Product weight (gram) | 7,429 | 7,385 | 7,475 | 7,362 | 7,496 |

TABLE IV.—BOLOGNA PRODUCT CIRCUMFERENCES STUFFED IN 8″ Hg. VACUUM STRETCHED SIZE 6½ FIBROUS CASINGS

| Bologna product measurement locations | Finished product circumferences (centimeters) | | | | |
|---|---|---|---|---|---|
| | Sample One | Sample Two | Sample Three | Sample Four | Sample Five |
| Distance from top (in.): | | | | | |
| 2 | 31.90 | 32.00 | 32.00 | 31.60 | 32.10 |
| 3 | 32.60 | 32.80 | 32.60 | 32.60 | 32.80 |
| 4 | 32.80 | 32.90 | 32.75 | 32.85 | 32.90 |
| 5 | 32.90 | 33.00 | 33.00 | 32.90 | 33.00 |
| 6 | 33.00 | 33.10 | 33.05 | 33.00 | 33.10 |
| 8 | 33.00 | 33.30 | 33.20 | 33.15 | 33.15 |
| 10 | 33.20 | 33.30 | 33.25 | 33.20 | 33.20 |
| 15 | 33.35 | 33.40 | 33.40 | 33.40 | 33.35 |
| Middle | 33.35 | 33.40 | 33.45 | 33.40 | 33.40 |
| Distance from Bottom (in.): | | | | | |
| 15 | 33.50 | 33.50 | 33.45 | 33.40 | 33.45 |
| 10 | 33.55 | 33.60 | 33.50 | 33.50 | 33.50 |
| 8 | 33.50 | 33.60 | 33.50 | 33.50 | 33.50 |
| 6 | 33.50 | 33.50 | 33.50 | 33.50 | 33.55 |
| 5 | 33.50 | 33.50 | 33.55 | 33.50 | 33.60 |
| 4 | 33.50 | 33.65 | 33.60 | 33.55 | 33.55 |
| 3 | 33.45 | 33.65 | 33.50 | 33.55 | 33.50 |
| 2 | 33.00 | 33.25 | 33.00 | 33.00 | 33.20 |
| Product length (inch) | 34.25 | 34.00 | 34.00 | 33.50 | 33.25 |
| Product weight (gram) | 7,765 | 7,690 | 7,625 | 7,610 | 7,562 |

TABLE V.—STANDARD DEVIATIONS AND PIECE-TO-PIECE UNIFORMITY INDEX OF BOLOGNA PRODUCTS STUFFED IN REGULAR AND 8″ Hg VACUUM STRETCHED SIZE 6½ FIBROUS CASINGS

| Bologna product measurement locations | Standard deviation of finished product circumferences (cm.) | |
|---|---|---|
| | Run VS-3-0 control | Run VS-3-8 8″ vacuum |
| Distance from Top (in.): | | |
| 2 | 0.247 | 0.192 |
| 3 | 0.187 | 0.109 |
| 4 | 0.083 | 0.065 |
| 5 | 0.083 | 0.054 |
| 6 | 0.074 | 0.049 |
| 8 | 0.070 | 0.108 |
| 10 | 0.065 | 0.044 |
| 15 | 0.035 | 0.027 |
| Middle | 0.075 | 0.035 |
| Distance from Bottom (in.): | | |
| 15 | 0.054 | 0.041 |
| 10 | 0.057 | 0.044 |
| 8 | 0.044 | 0.044 |
| 6 | 0.050 | 0.022 |
| 5 | 0.041 | 0.044 |
| 4 | 0.065 | 0.057 |
| 3 | 0.111 | 0.075 |
| 2 | 0.141 | 0.124 |
| Piece-to-piece uniformity index | 2.23 | 1.74 |

EXAMPLE V

Fibrous casings produced from different master paper roll cut positions exhibit different casing stretch characteristics, particularly when expanded to casing internal pressures of about 200 mm. Hg, the pressure at which Size 6 casings are normally stuffed. The casings produced from the near edge position (for example, B cut) stuff to a higher circumference than the casings produced from the near center position (for example, E cut). This difference noted in casing circumference is undesirable because, as discussed above, modern packaging methods are dependent upon products of uniform weight and/or circumference of each slice. This problem may be resolved in accordance with the invention by imparting varied amounts of vacuum stretching to the various papers, the amount of vacuum level applied being dependent upon the paper cut position. In this experiment, no vacuum was imparted to the stretchier B cut paper, 4″ Hg vacuum was imparted to the C cut paper, 6″ Hg vacuum was imparted to the D and E cut papers. Size 6 Fibrous casing was produced, and the data are presented in Table VI. The data indicate clearly that differences between the stretch curves at 200 mm. Hg of the vacuum stretched casings are significantly less than that of the regular-control casings.

uum stretch. Five samples of this variable stretched fibrous casing were stuffed with five samples of control fibrous casing without vacuum stretch. The casings are marked at the following distances from the top—7″, 10″, 20″, 30″, 33″. The circumferences of the stuffed and processed products are measured and presented in Table VII, which indicates significant improvement in top-to-bottom uniformity of the variable vacuum stretched fibrous casing over the control.

TABLE VI.—STRETCH CHARACTERISTICS OF FIBROUS CASING (SIZE 6) PRODUCED FROM DIFFERENT PAPER CUT POSITIONS.[1]

| Casing type | Paper position | Csg. diameters at following internal pressures (inches) | | | |
| --- | --- | --- | --- | --- | --- |
| | | 100 mm. Hg | 150 mm. Hg | 200 mm. Hg | 250 mm. Hg |
| Regular-control | B | 3.83 | 4.00 | 4.09 | 4.13 |
| | C | 3.89 | 4.01 | 4.08 | 4.12 |
| | D | 3.85 | 3.98 | 4.06 | 4.11 |
| | E | 3.82 | 3.98 | 4.06 | 4.11 |
| Vacuum stretched— | | | | | |
| 0″ Hg | B | 3.83 | 4.00 | 4.09 | 4.13 |
| 4″ Hg | C | 3.91 | 4.01 | 4.09 | 4.12 |
| 6″ Hg | D | 3.91 | 4.04 | 4.09 | 4.14 |
| 6″ Hg | E | 3.91 | 4.01 | 4.09 | 4.11 |

[1] Recommended stuffing diameter=4.07″.

EXAMPLE VI

It has been found possible to improve the top-to-bottom uniformity of the bologna product by imparting a variable amount of vacuum stretch to each piece of fibrous casing. The one end of the fibrous casing that corresponds to the bottom end of the vertically hung product is given little or no vacuum stretching, while the other end corresponding to the top of the product is given a few inches of mercury of vacuum stretching.

An experiment was conducted by passing size 6½ wet inflated fibrous casing through a vacuum chamber, with the vacuum level oscillating between 0″ Hg to 5″ Hg. The fibrous casing speed passing through the vacuum chamber was 30 feet per minute, and the oscillating cycle time was 20 seconds. As a result, a number of 10-foot long marked sections of variable vacuum stretched fibrous casings were prepared. A 40-inch long section of fibrous casing was cut from each of the 10-foot long sections of fibrous casing starting from the end with 0″ Hg of vac- TABLE VII.—COMPARISON OF TOP-TO-BOTTOM UNIFORMITIES OF BOLOGNA PRODUCTS PROCESSED IN CONTROL AND VARIABLE VACUUM STRETCHED FIBROUS CASINGS

| Casing Type | Sample No. | Finished Product Circumference at the Following Locations (cm.) | | | | |
| --- | --- | --- | --- | --- | --- | --- |
| | | 7″ top[1] | 10″ | 20″ | 30″ | 33″ bottom |
| Control (No vacuum) Stretch Size 6½ | 1 | 33.15 | 33.30 | 33.60 | 33.75 | 33.70 |
| | 2 | 33.25 | 33.40 | 33.80 | 33.85 | 33.75 |
| | 3 | 33.10 | 33.20 | 33.65 | 33.70 | 33.70 |
| | 4 | 33.10 | 33.30 | 33.70 | 33.85 | 33.90 |
| | 5 | 33.20 | 33.35 | 33.30 | 33.95 | 33.85 |
| Average | | 33.16 | 33.31 | 33.61 | 33.83 | 33.78 |
| Experimental (Variable vacuum stretch.) Size 6½ | 1 | 33.50 | 33.60 | 33.85 | 34.10 | 33.90 |
| | 2 | 33.30 | 33.40 | 33.75 | 33.95 | 33.90 |
| | 3 | 33.50 | 33.60 | 33.90 | 33.85 | 33.85 |
| | 4 | 33.70 | 33.75 | 33.80 | 33.80 | 33.75 |
| | 5 | 33.40 | 33.40 | 33.80 | 33.90 | 33.90 |
| Average | | 33.48 | 33.55 | 33.82 | 33.92 | 33.88 |

[1] Distance measured from top of casing before stuffing.

EXAMPLE VII

An experiment was conducted to determine whether or not it is possible to alter the stretch characteristics of the fibrous casing by imparting more than the normal amount TABLE VIII.—EFFECT OF IMPARTING VARIED AMOUNTS OF CIRCUMFERENTIAL STRETCH TO FIBROUS CASING DURING THE DRYING OPERATION ON THE REWET STRETCH CHARACTERISTICS OF PRODUCED FIBROUS CASINGS[1]

| Casing production condition | Stretch characteristics of experimental fibrous casings[2] | | | | | |
| --- | --- | --- | --- | --- | --- | --- |
| | Casing width | | Casing diameters expanded to the following air pressures—mm. Hg. | | | |
| | DFW[3] (in.) | RWFW[4] (in.) | 50 (in.) | 100 (in.) | 150 (in.) | 200 (in.) |
| Low internal pressures in casing, less circumferential stretch during drying | 4.13 | 4.31 | 2.86 | 3.14 | 3.27 | 3.36 |
| | 4.13 | 4.31 | 2.85 | 3.12 | 3.25 | 3.31 |
| | 4.14 | 4.31 | 2.90 | 3.10 | 3.25 | 3.35 |
| | 4.13 | 4.31 | 2.87 | 3.13 | 3.26 | 3.35 |
| | 4.14 | 4.31 | 2.85 | 3.13 | 3.29 | 3.37 |
| Average | 4.13 | 4.31 | 2.87 | 3.12 | 3.26 | 3.35 |
| High internal pressures in casing, more circumferential stretch during drying | 4.53 | 4.50 | 2.99 | 3.15 | 3.25 | 3.34 |
| | 4.56 | 4.52 | 2.99 | 3.19 | 3.27 | 3.34 |
| | 4.56 | 4.51 | 3.00 | 3.16 | 3.26 | 3.35 |
| | 4.56 | 4.52 | 2.99 | 3.15 | 3.26 | 3.32 |
| | 4.56 | 4.53 | 3.03 | 3.17 | 3.29 | 3.35 |
| Average | 4.55 | 4.52 | 3.00 | 3.16 | 3.27 | 3.34 |

[1] Casing size 4.
[2] Recommended stuffing diameter=3.29″.
[3] DFW=dry flat width.
[4] RWFW=rewet flat width.

of circumferential stretch to the casing during the drying-operation. Two experimental fibrous casings (Size 4) were produced, one with a higher-than-normal dry flat width of 4.55 inch, and the other with a lower-than-normal dry flat width of 4.13 inch. This was achieved by stretching the casing in the circumferential direction by varying the air pressure inside the casing during drying. The stretch characteristics of these two casings are presented in Table VIII above wherein it may be seen that although stretching was accomplished, little effect on lowering stuffing pressures was attained as compared with the results obtained in the preceding examples.

Although the reasons for the improved characteristics of casing produced in accordance with the invention are not completely understood, it is believed that certain structural changes have been induced in the casing during stretching of the fibrous casing. Thus, referring to vacuum prestretched casing, at a point prior to passing through the vacuum chamber 12, the casing is in a relatively low stressed state. When the casing travels into the vacuum chamber 12, it is subjected to considerable circumferential stretch. It is believed that to a very small extent, machine directional stretch has also been imparted to the casing. The joints between the hemp fibers of the base paper, which are bonded by regenerated cellulose, may be distorted by the stretch imparted to the casing inside the vacuum chamber 12. The regenerated cellulose layer of the fibrous casing may also be permanently deformed slightly.

The amount of stretching that the fibrous casing can tolerate is believed dependent upon the moisture content in the casing. If, for example, the fibrous casing is stretched inside the dryer while the casing is being dried instead of stretching the same casing to the same extent inside the vacuum chamber while the casing is wet, a problem of "fibering" can result, which is caused by the permanent separation between the fibers of the base paper and the regenerated cellulose (bonding material) between the fibers.

From the foregoing examples it will be seen that the extent of circumferential expansion attained in casing produced in accordance with the invention may be controlled by the difference in pressure within the casing material and the vacuum in the vacuum chamber and to some extent by the dwell time of the inflated casing material in the chamber. This dwell time of course is determined by the speed of travel of the material through the chamber and the length of the chamber.

Because the invention is suitable for use in the production of all commercially used casing sizes, it is difficult to set forth precise limits which will be the optimum for each casing size. Suffice it to say, however, that in general it is desired to attain as a minimum expansion in the vacuum chamber expansion to a diameter at least equal to the recommended stuffing diameter for that size casing and that using normal inflating pressure of about 100 mm. of mercury, the vacuum in the chamber must be higher the smaller the casing size being produced to attain the desired stretching, as is best shown in Table II above.

Since almost all of the expansion which takes place in the practice of the invention occurs almost instantly, the length of the chamber and the speed with which the material passes through it are of lesser importance than the pressure differential. Normal speeds of casing material through the drying chamber in conventional practice are about 20 to 40 feet per minute. These speeds may be used in the invention. The length of the vacuum chamber found to be most satisfactory is 24 inches, but as indicated, this is by no means a critical limitation.

Thus, it will be apparent that the invention provides a convenient, relatively simple way of producing casings of improved characteristics, and that the examples given herein illustrate the principles of the invention but because of its flexibility are not intended to set forth all variations which will occur to those skilled in the art.

What is claimed is:

1. In the method of producing a fibrous food casing which comprises forming a tube of paper; applying a viscose solution to such tube; regenerating the viscose solution in situ, thereby impregnating and coating said tube with a wet gel of regenerated cellulose; and inflating, drying, and flattening the impregnated tube, the improvement which comprises stretching the impregnated tube circumferentially to a diameter greater than a predetermined desired diameter before initiation of the drying of said gel, said stretching being controlled by placing the inflated tube in a partial vacuum, and reducing the diameter of the inflated stretched tube to such predetermined desired diameter, maintaining said tube which is stretched circumferentially to a diameter greater than said predetermined desired diameter and said tube which has been reduced to such predetermined desired diameter as parts of a continuous isolated bubble of entrapped air, and drying and flattening the impregnated and coated tube.

2. In the method defined by claim 1, the further improvement in which said stretched tube is at least partially reduced in diameter before initiation of said drying step.

3. In the method claimed in claim 1, the further improvement in which said inflated tube is passed through a vacuum of up to about 10 inches of mercury.

4. In the method claimed in claim 1, the further improvement in which said inflated tube is continuously passed through a chamber having a cyclically alternative atmosphere of about zero inches to eight inches of mercury thus producing different amounts of circumferential stretching of said tube in different portions along the length thereof on a controlled schedule.

References Cited

UNITED STATES PATENTS

| | | | |
|---|---|---|---|
| 2,210,436 | 8/1940 | Weingand | 99—176 |
| 2,337,927 | 12/1943 | Reichel et al. | 18—14 |
| 2,401,798 | 6/1946 | Reichel | 99—176UX |
| 2,492,441 | 12/1949 | Reichel | 99—176 |

FOREIGN PATENTS

| | | | |
|---|---|---|---|
| 94,509 | 6/1960 | Holland | 99—176 |

FRANK W. LUTTER, Primary Examiner

R. HALPER, Assistant Examiner

U.S. Cl. X.R.

18—14; 264—95